United States Patent
Viljoen

[11] 3,791,625
[45] Feb. 12, 1974

[54] FISHING NET HAULING SHEAVE DEVICE WITH POWERED PRESSER WHEEL SYSTEM

[75] Inventor: Johan P. Viljoen, Laaiplek, South Africa

[73] Assignee: Marine Construction & Design Co., Seattle, Wash.

[22] Filed: July 17, 1972

[21] Appl. No.: 272,460

[52] U.S. Cl. .................................. 254/138, 226/183
[51] Int. Cl. ............................................. A01k 73/06
[58] Field of Search ........ 254/137, 138, 190, 175.7; 226/176, 181, 183, 188

[56] References Cited
UNITED STATES PATENTS

| | | | |
|---|---|---|---|
| 2,733,531 | 2/1956 | Puretic | 254/138 |
| 3,399,868 | 9/1968 | Reischl | 254/175.7 |
| 3,448,962 | 6/1969 | Miller | 254/175.7 |
| 3,658,222 | 4/1972 | Dressel | 226/176 |
| 3,466,013 | 9/1969 | Smith | 254/175.7 |

Primary Examiner—Richard A. Schacher
Assistant Examiner—Gene A. Church
Attorney, Agent, or Firm—Orland M. Christensen; David L. Garrison; Bruce E. O'Connor; Ron D. Havelka

[57] ABSTRACT

A fishing net hauling sheave device of the Puretic type is disclosed in combination with an assist wheel which is power driven so as to maintain its surface speed at the speed of the net which it contacts and which is actuated so as to press against the net rounding the sheave under pressure which may be selectively adjusted so as to control the wheel's inhibiting effect on internal shearing tendency in the net passing over the sheave. Hydraulic controls and connections cause increase and decrease of power drive torque exerted by the wheel on the net coordinated with increase and decrease of wheel actuator pressure; furthermore, permit accommodation of hydraulic fluid back flow cause by reaction of the actuator in response to outward deflection movement of the wheel when passing over thickening sections of net.

10 Claims, 10 Drawing Figures

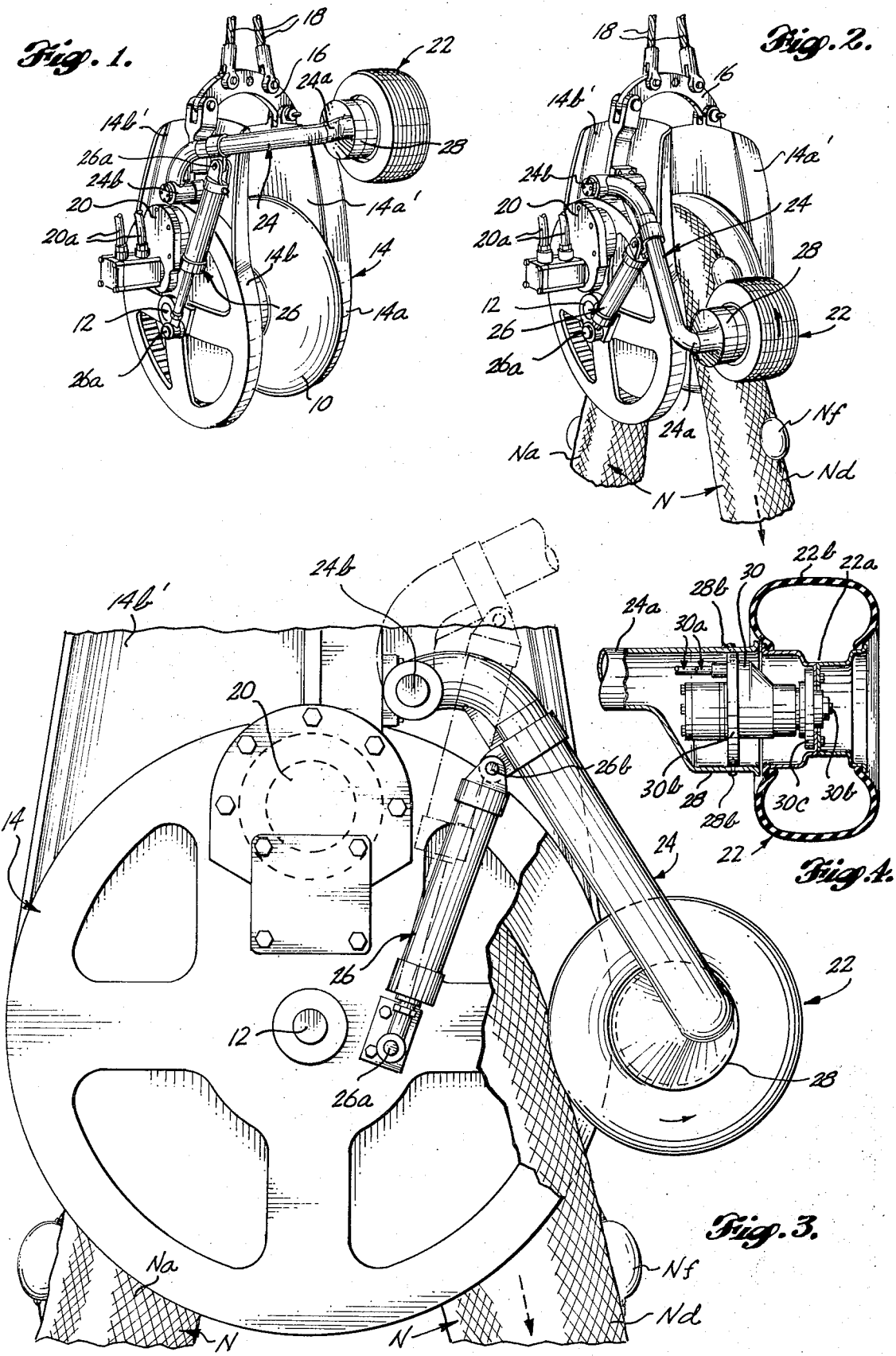

FISHING NET HAULING SHEAVE DEVICE WITH POWERED PRESSER WHEEL SYSTEM

FIELD AND GENERAL NATURE OF INVENTION:

This invention relates to mechanized hauling of fishing nets using a power driven sheave or block device of the type generally shown and described in U.S. Pat. No. 2,733,531. The block is elevated such that the net drapes bundled over its sheave and such that the suspended weight of the net's upwardly and downwardly moving columns assures some compaction of the net in a bundle rounding the sheave accompanied by frictionally-driven pressure engagement of the net with wall surfaces of the sheave. More specifically the invention relates to improvements utilizing a presser wheel so driven with a torque and so actuated with a presure against the net that all parts of the net passing through the sheave are more positively and uniformly engaged and driven under the various conditions of movement and loading encountered in net hauling and such that the internal shearing tendency inherent in the net during hauling by such a sheave drive is selectively inhibited and regulated.

BACKGROUND OF INVENTION

A problem encountered in the use of elevated power driven sheave devices for hauling fishing nets under some conditions has been a tendency to exert hauling force on that portion of the net which it most compactly wedged down in the base of the sheave groove with little or no slippage and thereby move it at a faster rate than the looser outlying layers of the net where the mesh portions are less highly interlocked with adjoining portions and where those portions which do contact the sides of the sheave do so under lighter pressure. Hence, there is more slippage between the sheave and the net's radially outer regions than its inner regions and more relative slippage between layers of mesh within the net bundle itself in those outer regions, resulting in interval shearing tendency within the net racking or shifting it out of square. In hauling purse nets, for example, the weight or lead line and immediately adjoining mesh tend to lie in the base of the V-shaped groove of the hauling sheave and thereby to be driven frictionally with virtually no slippage. The cork line, associated corks or floats, and immediately adjoining mesh lying in the outer part of the net bundle passing around the sheave tend to be driven at a slower rate. The result is for the driving effect of the sheave to produce shearing effect within the net causing it to warp or rack increasingly out of square as the hauling progresses. Moreover, in the case of a fairly long net, there is an attendant inability to complete the haul using the sheave device because the lead line is brought in tight while a substantial amount of the cork line is still in the water.

In some kinds of fishing and with certain types of nets, the above-mentioned problem is quite troublesome. For example, if the net hauling device is positioned at a relatively low elevation, the suspended weight of the rising and descending columns of net is relatively small and the net, bundled in passing around the sheave, is not sufficiently compacted for unified interlocking of the mesh nor for adequate traction of all parts of the net with the sheave sides to cause all parts to haul at the same rate. Also, for a given sheave elevation, the larger the net and the wider in cross section it is, the greater the described difficulty. Of course, with a narrow (i.e., transverse span between cork and lead lines) seine net hauled by a powered block of the Puretic type held highly elevated, the net comes in efficiently and square. But in many fisheries of the world, the nets differ and boats differ so that the ideal use of this nature is not possible.

Various devices have been used in attempts to compact the net more tightly together in the sheave groove so as to overcome the aforementioned shearing tendency. For example, in some cases crewmen have been sent aloft to walk on the net as it is being hauled. This is dangerous work and not very effective. A press roller has also been used to compact the net in the sheave groove. The roller was bearing mounted in order to turn as freely as possible in running on the net. Pressure from the roller to compact the net was produced by the force of a hydraulic cylinder and piston device. However, the arrangement proved less than satisfactory and in some instances contributed to the problem. For instance, it was found that portions of netting and accumulations of floats would often bunch up ahead of the roller forming an obstruction to their free passage around the sheave during the hauling process. Thus, the lead line and innermost portions of net in the base of the sheave groove would continue to be advanced by rotation of the sheave whereas the cork line, floats, and outermost portions of the net would be arrested by the presser wheel. Moreover, excessive pressure of the presser wheel against the net could produce overcompensation for the described shearing effect and produce shearing effect in the opposite direction by too tightly locking the outer mesh layers with the inner mesh layers so that the former were hauled faster due to their longer arc of travel around the sheave.

An object of the present invention is to provide improvements for which overcome the aforementioned shearing problems, permit efficiently operating a net hauling sheave device suspended at relatively low elevation, assist in maintaining the net in squared condition while being hauled under any conditions, contribute to the hauling effort, and thereby expedite and facilitate hauling, and further aid in achieving more positive control of the net during hauling.

Still another object of the invention is to provide such a system wherein the cooperating parts are compatible with power sources and drive mechanisms commonly available in fishing boats; and furthermore, wherein the mechanism providing the assistance to the power driven sheave device is compatible with existing power driven sheave devices of this nature. In this latter regard, the invention is adapted such that its net compacting and drive mechanism may be incorporated integrally with commercially available hauling device sheave or block units without affecting or limiting the manner in which the latter are suspended or mounted for operation.

Another object of the invention is to devise a net hauling device of the powered sheave type with associated presser wheel means by which the float line and cork line portions of the net may be driven at the same rate, or by which controlled relative hauling rates of these net portions may even be produced.

These and other objects, features, and advantages of the invention will become more fully evident as the description proceeds with reference to the accompanying drawings.

DESCRIPTION OF DRAWINGS:

FIG. 1 is an isometric view of a net hauling powered sheave device with a presser wheel attachment according to this invention with the wheel retracted; FIG. 2 is a view similar to FIG. 1 with the wheel actuated under pressure against a net moving over the sheave; FIG. 3 is an enlarged side view with parts broken away of the same device showing the actuating mechanism for the presser wheel support; and FIG. 4 is a fragmentary view partly in section showing the wheel and wheel drive motor mounting details associated with the wheel support.

Figure 5:
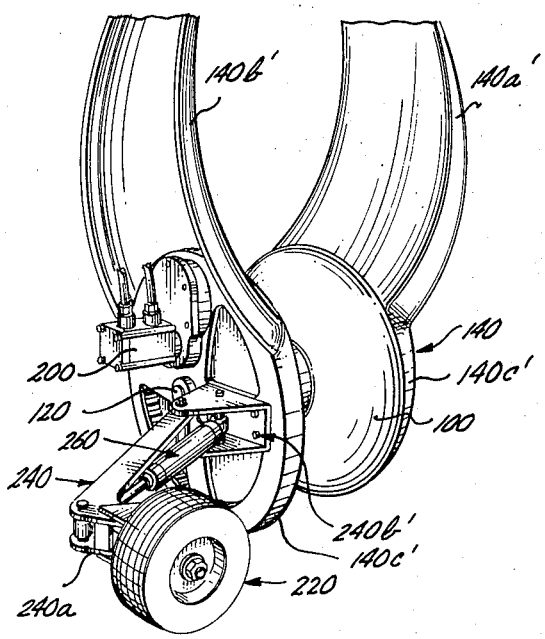
FIG. 5 is an isometric view of a powered net hauling sheave device of different construction with the upper part of the guide portions of the frame broken away for convenience in presenting the view and with a modified assist wheel device incorporated therein, the presser wheel support being shown in the retracted position.
Figure 6:
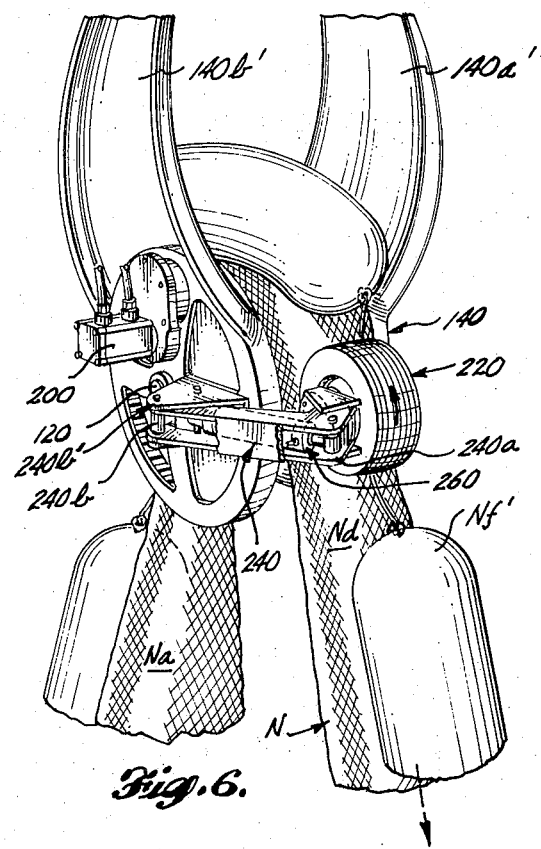
FIG. 6 is a view similar to FIG. 5 with the presser wheel mechanism in actuated position riding on a net passing around the sheave.
Figure 7:
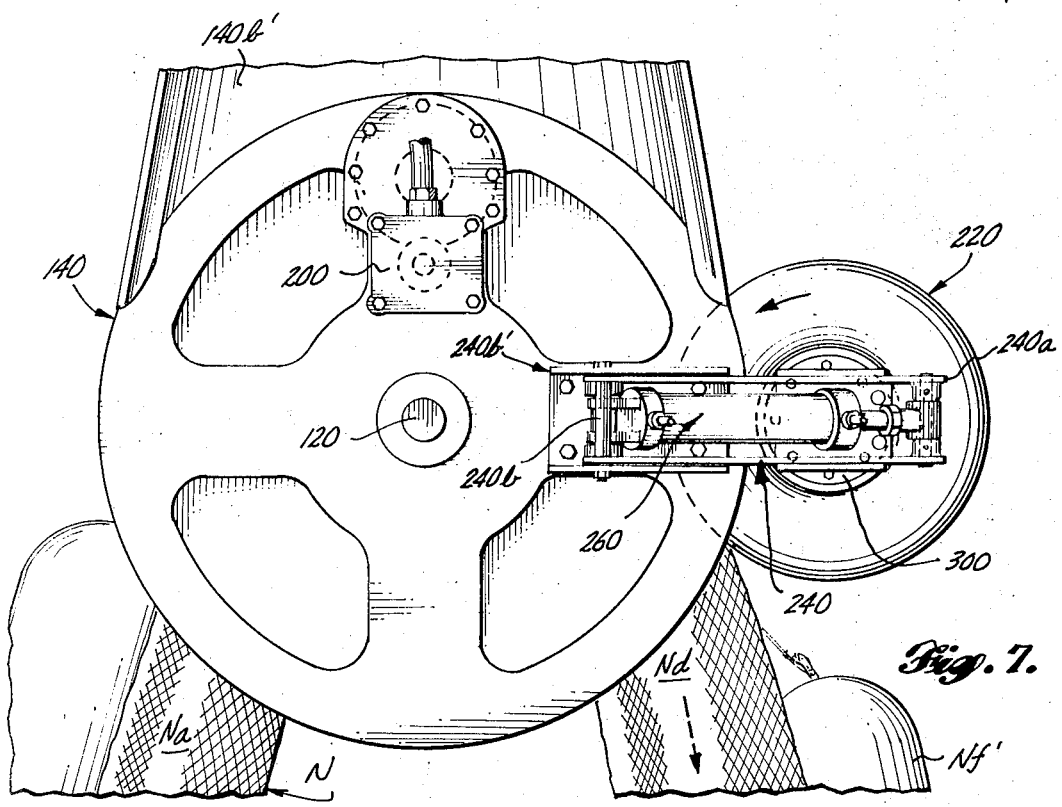
FIG. 7 is an enlarged side view of the same device in the setting shown in FIG. 6.
Figure 8:
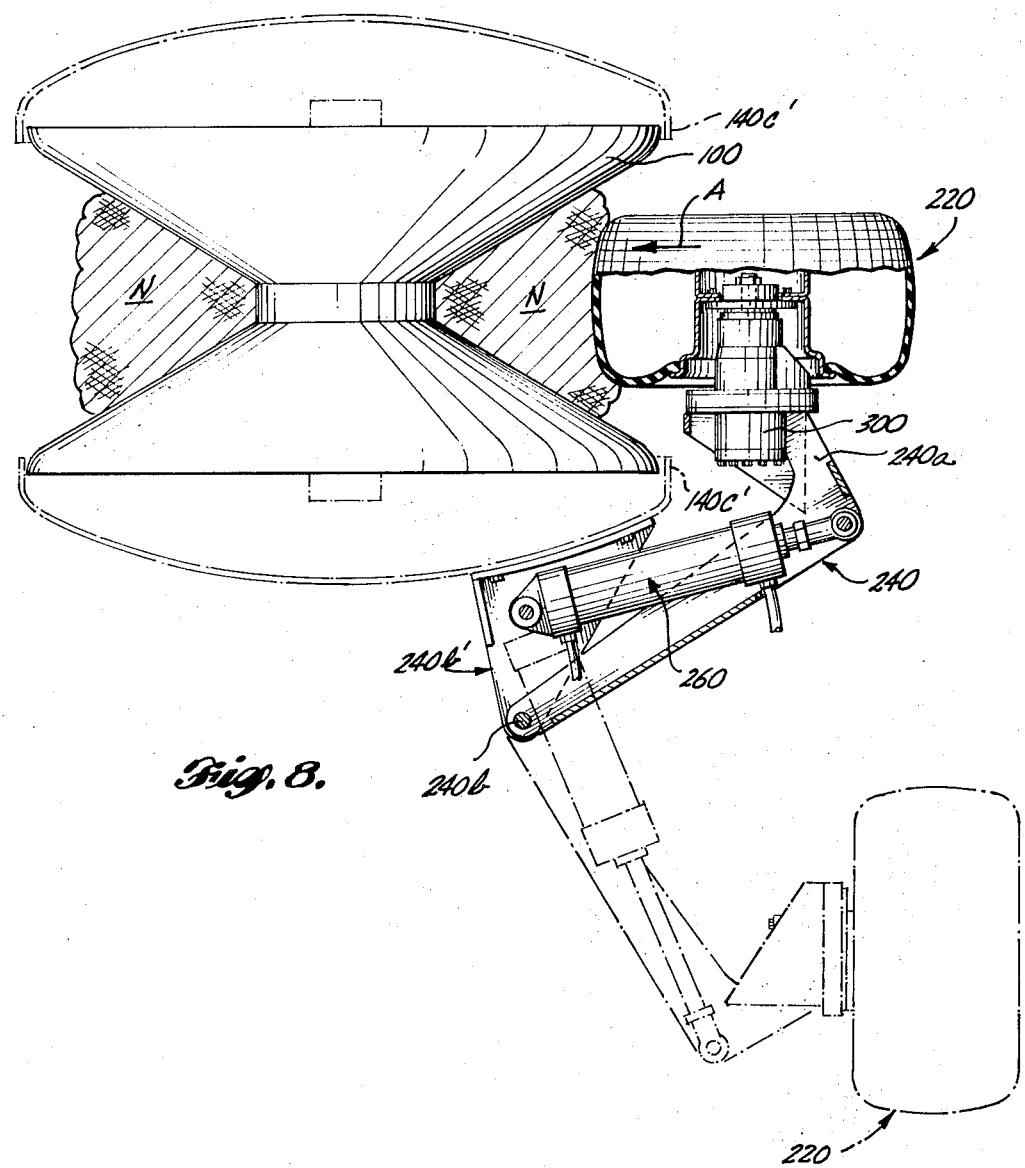
FIG. 8 is a top view, with parts broken away, of the same device showing the actuator by solid lines in its operating position and by broken lines in its retracted position.

DETAILED DESCRIPTION BY REFERENCE TO DRAWINGS:

In the embodiment shown in FIGS. 1-4, the net hauling sheave device comprises a sheave 10, the inside walls of which form an inwardly tapered groove which may be rubber covered and cleated in the usual manner. The sheave turns on a shaft 12 supported in a frame 14 the opposite sides of which 14a and 14b serve as net guides helping to keep the net in the sheave groove during hauling as depicted in FIG. 2. In this embodiment the frame sides extend upwardly as ears or flanges 14a' and 14b' respectively and are cross-connected at the top by an arching bar 16 forming with the flanges 14a' and 14b' a support yoke. This yoke structure adapts the device to be suspended by line 18 such as from one or more blocks on the end of a boom or davit maintaining the unit in elevated position above the deck of the fishing vessel. The support details are not shown, but normally are such as to permit free swinging and free swiveling of the block device so as to address itself to the median of the ascending and descending columns Na and Nd of net N draped over the sheave 10. This mounting arrangement enables the unit to perform its own fairlead function, assuring optimum engagement with the net for hauling purposes.

A hydraulic motor unit 20 is mounted on the side of frame 14 and is connected through suitable gearing (not shown) to rotatively drive sheave 10. Hydraulic supply and return lines 20a associated with the motor carry hydraulic pressure fluid to and from the motor in order to operate the sheave device in one direction of driven rotation or in the opposite direction as determined by an operation controlling the positioning of valves in a control console (not shown).

The basic net hauling device shown in these figures as thus far described, as in the case of the embodiment shown in FIGS. 5-8, is well known. Nets are hauled and nets are reset using a device of this nature in most countries using purse seine nets and other types of net lending themselves to handing in this manner.

Modification of the sheave device by way of additions according to this invention, as shown in FIGS. 1-4, include mounting a presser wheel 22 for turning in the general plane of the sheave 10, on an axis of rotation parallel to the sheave's axis of rotation. The presser wheel is mounted on a movable support 24 which is operated by an actuator 26 so as to be movable between retracted and operating positions. In its operating position shown in FIG. 2 the presser wheel 22 is actuated under pressure urging it against the bundle of net passing over the sheave 10, preferably on the off-bear side of the sheave, that is on that side of the sheave from which the column of net $N_d$ descends. In this case the wheel support comprises an elongated arm mounted at its base by a fitting 24b located on one side of frame 14 just above motor unit 20. Mount 24b permits the arm to swing on an axis parallel to sheave's axis. From this base connection the arm extends parallel to and alongside the frame to a location beyond the rim of sheave 10 and then turns inward at right angles. Its inturned outer end 24a extends parallel with the sheave axis and terminates in an enlarged portion forming wheel support and drive motor housing 28.

A hydraulic motor 30 having hydraulic fluid supply and return lines 30a is mounted within the housing 28 by way of base plate 30b secured to the housing by bolts 28b. The motor's output shaft 30b carries a mounting flange 30c by which to support the wheel's split rim 22a. The wheel rim carries a pneumatic tire 22b inflated under suitable air pressure such as 25 pounds per square inch, more or less, enabling the tire to flex and run smoothly over irregularities such as floats and knots in the net. The wheel and tire used may be of the type commonly used as in landing wheels of small airplanes.

The wheel mount actuator 26 in this instance comprises a hydraulic piston and cylinder jack of known type, one end of which is pivotally anchored at 26a to one side of the sheave device housing 14, and the other end of which is pivotally fastened at 26b to a point on the arm intermediate its ends. Extension of the hydraulic jack 26 moves the arm and wheel assembly 24, 22 into the retracted position shown in FIG. 1 and contraction of the jack moves the assembly into the operating position shown in FIG. 2. By means of this same hydraulic jack pressure of an amount controlled by pressure of hydraulic fluid delivered to the hydraulic cylinder is caused to be exerted by the presser wheel 22 against the net for the described purposes.

With a net hauling sheave device of the type and configuration shown in FIGS. 1-4, the side ears or guides 14a' and 14b' project only a relatively short distance above the periphery of the sheave 10. Thus the intervening opening beneath connecting bar 16 is not large but is adequate for the passage of nets of the type which have relatively small floats $N_f$ (FIG. 2). Such devices may be of any size to work with large or small nets. For nets using large buoys or floats, a different guide construction is commonly employed as depicted in the embodiment of FIGS. 5–8. The net guides in this case, that is the portions thereof 140a' and 140b' which project above the net spool 100, are not only tall, but are bowed outwardly from each other in order to provide a relatively large yoke space above the sheave 100 for passage of the net in hauling. In this modified configuration, the general construction and operating features of the device per se may otherwise be similar to those shown in FIGS. 1–4. These include the frame structure 140, the means including the shaft 120 by which the sheave 100 is mounted for rotation about a generally horizontal axis between the sides of the frame structure, and the provision of a hydraulic motor unit 200 mounted on one side of the frame structure and drivingly connected to turn the sheave 100. The upper ends of the guides 140a' and 140b' omitted from the views are suitably connected together by means adapting the unit for suspension from a boom or other elevated support for operating purposes.

In FIGS. 5–8 the presser wheel 220 is mounted to operate generally in the same position in relation to the net hauling device spool 100 as was the wheel 22 in the first embodiment. In this instance the hydraulic drive motor 200 by which the wheel 220 is turned is carried on one end of 240a of an L-shaped support arm 240. The arm's opposite end is pivoted on a vertical axis by a pin connection 240b' with a mounting bracket 240b fixed to the side of the frame 140. The pivot axis for the arm 240 is not parallel with the spool axis in this embodiment but is at right angles to the spool axis, and with the block hung normally will be vertical. This selection of orientation for the pivot axis of the arm 240 together with the L-shaped configuration of the arm causes the arm to retract by swinging in a horizontal plane from the operating position shown in FIG. 6 to retracted position shown in FIG. 5 wherein it is offset clear of the sheave. Vertical retraction of the arm by swinging on a horizontal axis in the configuration of net hauling device shown in FIGS. 5–8 would present serious mechanical problems because of the presence of the net guides 140a' and 140b'. However, it is normally desirable to mount the presser wheel so that it swings in the plane of rotation of the hauling sheave and its force against the net in all operating positions thereby has maximum effect to compress the net in the base of the sheave groove. With the wheel support arm 240 pivoted on an upright axis, however, as in FIGS. 5–8, it will be seen from the arrow A defining an arc of motion centered about the pivot axis defined by pin 260a that the relative direction in which force is applied by the presser wheel to the net will vary somewhat from the sheave's plane of rotation depending upon thickness of the net in the sheave groove. In order to minimize this variation the bracket 260 is so located and so proportioned as to position the pin 260a toward the offbear side of the net and laterally outward from the side of the frame 140 whereby the presser wheel swings on a fairly large radius and presses against the net in a direction approximately in the plane of rotation of the sheave 100. The L-shaped configuration of the arm enables it to clear the rim of the sheave and associated frame rim 140c' overlapping the sheave's edge.

Figure 9:
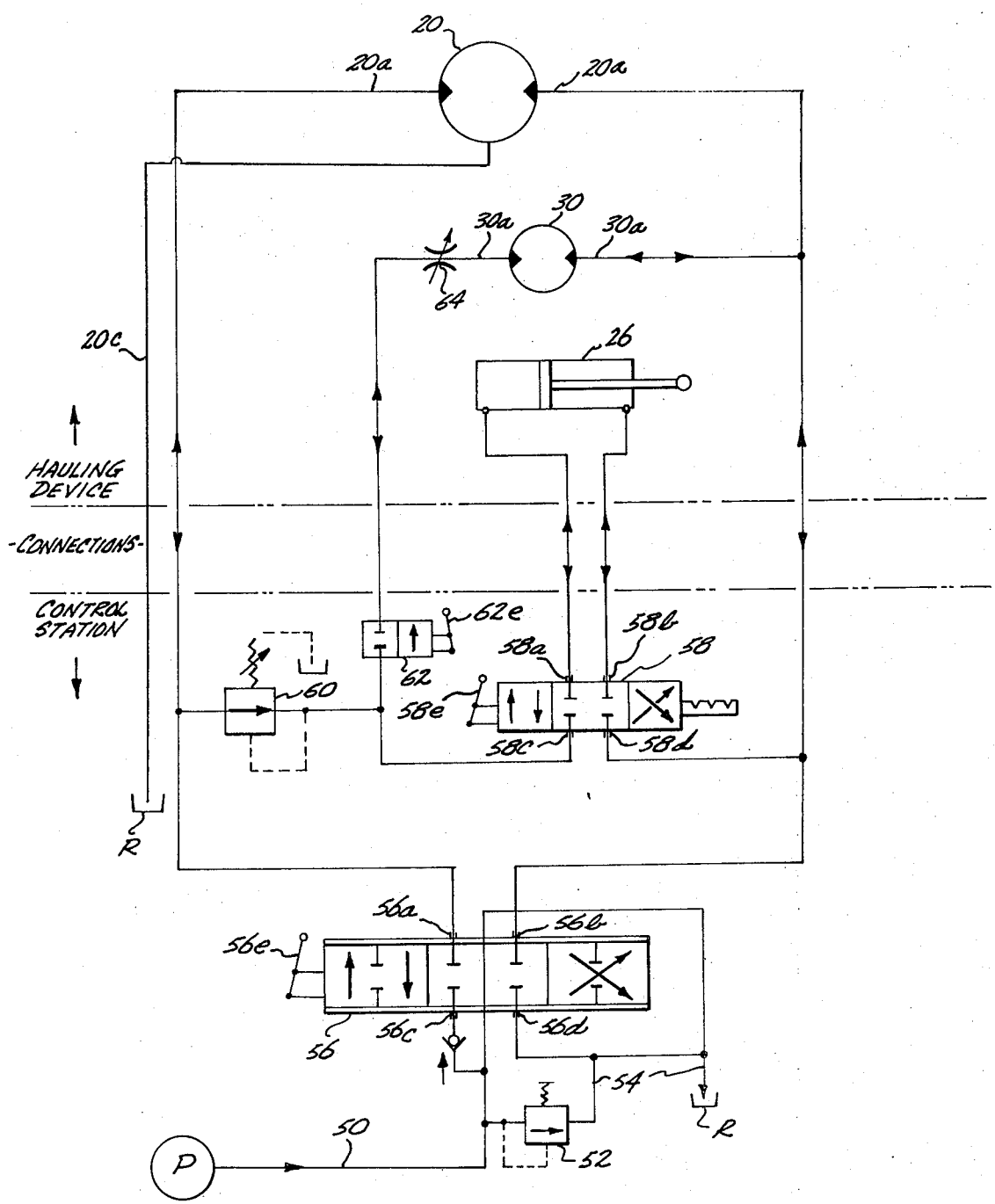
FIG. 9 is a schematic diagram of the hydraulic system for operating the net hauling sheave device and associated presser wheel and its actuator in accordance with the invention.

Turning now to the means for operating and controlling the hydraulic drive motors and support actuator, reference will be made first to FIG. 9 describing a preferred embodiment of control system applied to the mechanism depicted in FIGS. 1–4. In FIG. 9 hydraulic fluid under pressure is available from a pressure pump P through a line 50, the maximum pressure of which is limited by a relief valve 52 which bleeds excess fluid back to the return or reservoir R through a return line 54. The pump is normally driven by the boat's engine or by an auxiliary engine below decks in the vessel. The pressure and return lines 50 and 54 lead from below decks to a control station situated on deck at a convenient position where the operator can observe and control the net hauling operation.

A main element of the control console at the control station is the master control valve 56 which comprises a three-position hydraulic valve shown symbolicly in conventional manner. Valve 56 has two load-side ports 56a and 56b and two source-side ports 56c and 56d. In the middle setting of its control handle 56e the load ports 56a and 56b are cut off from the pressure source and reservoir ports 56c and 56d as shown in FIG. 9. In one of its other two settings, port 56c is connected to port 56a and port 56d to port 56b. In the second of its other two settings these connections are crossed over so that port 56c is connected to port 56b and port 56d is connected to port 56a, as the symbols indicate. In the first of the two operating settings of the valve, hydraulic pressure from pump P causes the power block motor to turn in one direction by flow of pressure fluid from port 56a to the left side of the motor in the illustration. In the second of the two operating settings, driven rotation of the motor 20 is reversed. In either the flow circuit includes the connection lines 20a between the motor 20 and valve ports 56a and 56b.

A second three position valve 58 in the control console has load-side ports 58a and 58b connected to the respective ends of the cylinder of the hydraulic actuator 26 for the presser wheel. This valve 58 also has source-side ports 58c and 58d, the former being connected to the master valve port 56a through a pressure-reduction regulating valve 60, and the latter (58d) being connected to the master valve port 56b. In one setting of the valve's control handle 58e the jack cylinder 26 is isolated from the master valve 56, hence from the pressure source P and reservoir R. In this setting of the valve the piston is locked against movement in either direction. In either of the other two settings of valve 58 the jack 26 is driven either to extend or contract so as to move the presser wheel either toward operating position (FIG. 2) or toward retracted position (FIG. 1). Pressure reduction valve 60 is shown to be of the adjustable type enabling the operator to establish and vary the pressure exerted by the presser wheel against the net by way of the hydraulic jack 26. In order for the operator to make this adjustment conveniently, the pressure reduction control valve 60 is also located in the control console.

Also in the control console is situated a two-position valve 62. This valve is interposed in the hydraulic line 30a connecting one side of the presser wheel motor 30 to the regulated pressure side of the valve 60. The opposite side of motor 30 is connected to the master valve load-side port 56b along with the corresponding side of the sheave drive motor 20. An adjustable flow control valve 64 interposed in line 30a limits rate of flow which can occur through the presser wheel drive motor 30. Motor 30 is actuated to be a relatively low-capacity, low displacement rate motor, compared with the drive motor 20 for the sheave device itself. The reason for selecting a motor 30 of these characteristics and also for interposing the adjustable flow control 64 in series with the motor is to insure that the motor will not have the capacity to drive the presser wheel faster than the net which it engages and which is driven primarily by sheave 10. However, the motor does have sufficient torque and speed capability to drive the wheel so as to run up and over floats and bunches of netting which might otherwise impede such rolling action of the presser wheel. It can therefore be appreciated that the controlled device characteristics of the motor require special attention in design based on the type of net and other variables that affect the torque and speed requirements of the motor in order for it to drive the presser wheel adequately to synchronize with the net without overspeeding and scrubbing effects.

A second function of the flow restrictor 64 is to prevent the flow path through the presser wheel motor 30 from stealing undue amounts of hydraulic fluid from the sheave drive motor 20 with which it is connected in parallel, in the event of heavy loading on the presser wheel drive motor 20 when it needs full energization to do the job.

In the illustration valve 62 is selected as a two-position valve which in one position disconnects the presser wheel motor 30 from the master source, and in the second position makes the connection to the master source such that the presser wheel will turn in one direction or the other, depending upon the setting of the master control valve 56. The valve 56 therefore controls direction of both motors 20 and 30.

In the embodiment of FIG. 9, it will be noted that there are five main hydraulic lines connecting the control station components to the hauling device components. These usually comprise reinforced flexible rubber hoses which extend up the mast and out the boom to the net hauling device suspended from the end of the boom. There is also a sixth line in the example which comprises the drain line 20c returning seepage collecting in the housing of motor 20 back to the reservoir R.

In operation of the system according to this invention as depicted in FIG. 9 taken in conjunction with FIGS. 1-4, a tow line (not shown) secured to the leading end of a purse seine net to be closed and hauled is led over and through the sheave 10 so as to draw the leading end of the net in a compacting bundle up and over the sheave preliminary to starting operation of the sheave drive motor 20. The presser wheel 22 may or may not be in the retracted position (FIG. 1) during this step. As the net bundle is being drawn over the sheave master valve 56 is shifted from the neutral setting to energize the motor 20 so as to turn the sheave in the proper direction to help advance the net. Initially and until suspended weight of the net forces it compactly into the sheave groove, continued pull on the tow line may be necessary. The actuator valve 58 is now also positioned to advance the presser wheel against the net (FIG. 2) under a pressure established by regulator valve 60, and the presser wheel drive motor 30 is set into operation by opening the valve 62. Setting of valve 56 establishes the direction of rotation of both motors 20 and 30 to cooperate in hauling of the net. Torque of motor 20 produces most of the hauling force. Torque applied to motor 30 is primarily to aid the presser wheel to remain snychronized with net's motion despite floats and bulges in the net.

It will be noted that under the operating conditions just described and with the controls set in the described manner to achieve these conditions, both the presser wheel drive motor 30 and the presser wheel actuator 26 are subjected to the same hydraulic pressure, namely that delivered by the master source P through the regulator valve 60. Consequently, if the setting of valve 60 is adjusted up or down, both the drive torque exerted by the press wheel motor 30 and the actuation pressure exerted by the presser wheel against the net are varied correspondingly. This is desirable because the aforementioned conditions or criteria used in selecting the torque and flow displacement characteristics of the motor 30 are a function of pressure exerted by the presser wheel against the net. The greater this pressure against the net, the greater the torque that is required in order for the presser wheel not to slip and scrub on the net. Moreover, the greater the pressure exerted by the presser wheel against the net, the greater the torque which will be required to enable the presser wheel to climb up and over accumulations of floats and bunches of net which might otherwise obstruct passage of the net freely under the presser wheel. Back-flow from motor 20 caused by net motion adds to the pressure of actuator 26.

Under most operating conditions in hauling a net the sheave 10 and the associated presser wheel 22 will be driven either continuously or interruptedly in the same direction as depicted by the arrows in FIG. 2. Under some conditions, however, such as when the tuna fish or other specie may become caught in the mesh of a seine net, it becomes desirable for the operator at the control console to apply a series of brief and abrupt reversals in the direction of drive being applied to the hauling sheave in order to shake the fish loose before it reaches the hauling device. There may also be other occasions when drive reveral is desirable.

It is also noteworthy in FIG. 9 that with the actuator valve 58 set in the operating condition to urge the presser wheel 22 against the net jack 26 is contracted. Should now the presser wheel be required to climb up and over a large float or accumulation of netting, the arm 24 must deflect outwardly to permit this, and this means that there must be a sudden and substantial change in the relative quantities of hydraulic fluid contained in the opposite end portions of the actuator cylinder. In order for this to occur, it is obvious since hydraulic fluid is substantially incompressible that the fluid must have a path to permit such displacement. However, because the hydraulic pressure established by the regulator 52 is set, it is necessary for back-flow from the actuator to occur in a different path. The path afforded in the illustrated embodiment is that which includes the valve 62 (set) in its operating condition) and the presser wheel drive motor 30 connected directly across the actuator 26 through the valve 58 as shown. Thus the press wheel motor 30 affords a relief path permitting the actuation pressure exerted by the presser wheel on the net to remain substantially constant while the wheel is permitted to ride up and over large floats or other thickening elements of the net passing beneath the presser wheel during hauling.

As previously stated, the flow restrictor 56 prevents the presser wheel from operating too fast and thereby from sliding on the net, and it also prevents the presser wheel drive motor 30 from stealing hydraulic fluid from the main sheave drive motor 20 when the latter is under heavy load.

It will also now be evident that by adjustment of the setting of pressure control valve 60 the amount of presser wheel drive torque and the amount of operating pressure of the presser wheel against the net may be varied up or down and thereby the effect of the presser wheel may be varied to inhibit shearing tendency in the net as previously described. The greater the pressure and the greater the applied torque, the more the shearing tendency in the net can be progressively offset until a point is reached where the tendency is completely nullified during hauling of the net so that the net remains square. Moreover, should it be desired to more than compensate for shearing tendency and cause the net to move out of square in the opposite direction from the normal tendency, it is possible by a still further increase in operating pressure applied to the actuator to achieve this result. That this is possible may be seen from the fact that the radially outer portion of the net moves through a longer arc in rounding the sheave than the inner portions of the net. This overcompensation would not be involved except under extraordinary circumstances, such as when it is desired to restore a squared condition.

Figure 10:
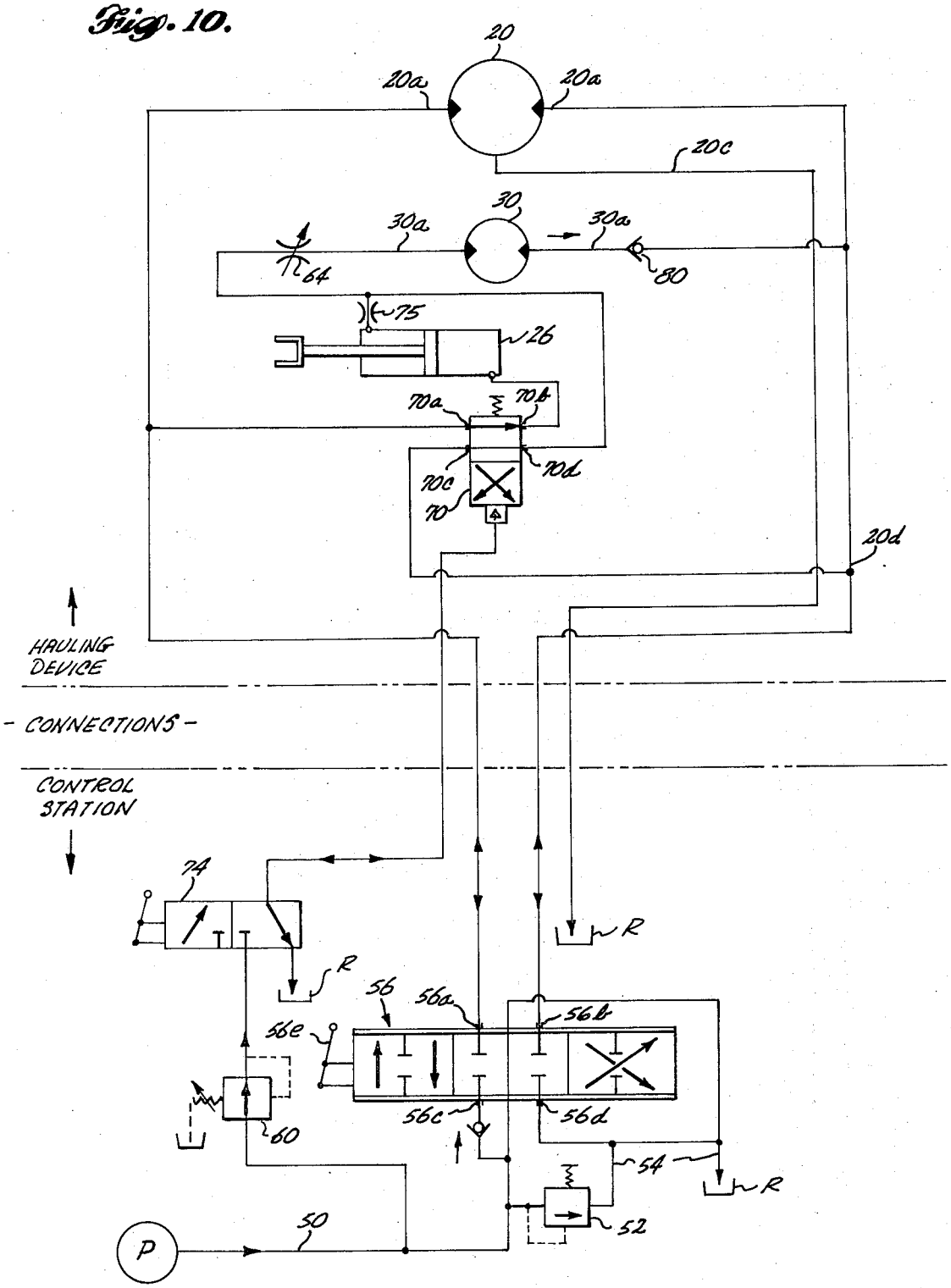
FIG. 10 is a schematic diagram of an alternative hydraulic system incorporating features of the invention.

In FIG. 10, parts which correspond to similar parts in FIG. 9 bear similar reference numerals and need no separate description herein. In general, FIG. 10 illustrates an alternative embodiment wherein it is possible to connect the control station controls and source with the hauling device through use of fewer hydrualic lines, in this case a total of four as compared with six in the earlier example. This reduction and simplification of control connections is made possible by use of a pilot-operated valve 70 mounted remotely on the hauling device so as to control remotely the direction of pressure applied to the actuator 26 and to the press wheel drive motor 30 in response to control pressure from the selector valve 74 in the control station. In the illustrated setting of the pilot-operated valve 70 hydraulic pressure fluid from port 56a in the master valve 56 flows directly through ports 70a and 70b of valve 70 to the right-hand side of the actuator 26, whereas the left side of the actuator is connected to flow restrictor 64 and thereby to motor 30, hence through check valve 80 to the line which connects to the load side port 56b of the master valve 56. In this setting both sides of the press wheel drive motor 30 are connected to a common point 20d in the primary flow circuit, so that the motor is not driven, the jack being actuated in a direction to retract the presser wheel support.

When the valve 70 is reversed by switching the selector valve 74, the ports 70c and 70d are interconnected and the ports 70a and 70b are interconnected so as to reverse the direction of actuation of the actuator 26 and to pass hydraulic fluid under pressure through the drive motor 30 and check valve 80 in a direction to complement operation of the sheave motor 20 in its hauling operation. Flow restriction 75 prevents hammering of the jack in moving to its extreme positions when valve 70 reverses.

Check valve 80 prevents reverse flow of fluid through the hydraulic drive motor 30 for the presser wheel and thus prevents the presser wheel from stealing fluid from the sheave drive motor 20 when the latter is being driven in a reverse direction, and it is not intended that the presser wheel should be driven, whatever the setting of the actuator 26.

These and other aspects of the invention and variations from the illustrated embodiments thereof which are within the purview of the inventive concepts will be evident to those familiar with the art and who have gained an understanding of the improvements herein disclosed. Accordingly, it is intended that the scope of the invention is to be determined in accordance with the claims which follow them, rather than restricted to details of the illustrated embodiments.

I claim:

1. In a fishing net mechanized hauling system, the combination comprising a sheave device including a net-engaging sheave over which a net is draped in the process of hauling the net, a support frame to support the sheave for rotation about a generally horizontal axis, net guide means also supported by the frame to help direct the net in passing over the sheave, and a sheave drive for turning the sheave under power so as to haul the net passing over the sheave, said combination further comprising a net-engaging presser wheel, a moveable support carrying the presser wheel for rotation about an axis generally parallel with the sheave axis while maintaining the wheel in rolling contact with the net where it passes over the sheave, a wheel drive for turning the wheel under power at a torque maintaining its surface speed substantially the same as the speed of the net which it contacts while pressed against such net, and wheel support actuator means operable through the wheel support to press the wheel against such net so as to inhibit the shearing tendency in the net passing over the sheave.

2. The combination defined in claim 1 and means to selectively adjust pressure of the presser wheel applied by the actuator means so as to vary the effect of the presser wheel in internal shearing tendency in the net passing over the sheave.

3. The combination defined in claim 2 and means commonly connected with the wheel drive and wheel support actuator means so as to increase and decrease wheel pressure automatically with increase and decrease of power drive torque applied to the wheel 4. The combination defined in claim 3 wherein the presser wheel drive comprises a first hydraulic fluid motor and the wheel support actuator means comprises a hydraulic pressure fluid actuator, said means commonly connected comprising a source of hydraulic pressure fluid including means to selectively vary the pressure of such fluid, and associated hydraulic circuit means connecting said source to both the actuator means and the motor.

5. The combination defined in claim 3 wherein the fluid actuator comprises a piston and cylinder hydraulic actuator and the circuit means includes a pressure regulator therein regulatively limiting at a selected maximum the drive pressure of hydraulic fluid applied to said motor and actuator, said circuit means further including a fluid path for direct flow of pressure fluid between the fluid motor and fluid actuator whereby fluid back-flowing from the actuator in response to reactive outward deflection of the wheel caused by thickening of the net, against pressure of the actuator, is accommodated by passage of such back-flowing fluid through the fluid motor when operating pressure of the regulator is exceeded.

6. The combination defined in claim 3 wherein the sheave drive comprises a second hydraulic fluid motor also connected in said circuit means for operation by said source independently of said pressure regulator.

7. The combination defined in claim 6 and valve means in said circuit means for selectively reversing the direction of driven rotation of the second hydraulic motor, and alternately for stopping such driven rotation of both motors.

8. The combination defined in claim 7 wherein the circuit means includes connections which afford a path to the actuator for flow of hydraulic fluid pressed back by the second motor in response to reactive reversed direction of rotation of the second motor caused by reverse movement of the net, whereby the wheel pressure against the net is then increased by the actuator.

9. The combination defined in claim 8 wherein the circuit means include a separate reversible control valve in the path from the source to the actuator so as to permit lifting of the presser wheel thereby from the net independently of driven rotation of the second hydraulic fluid motor.

10. The combination defined in claim 1 further including means operable to control actuator pressure of the wheel against the net, said last means being responsive to reverse direction of rotation of the sheave caused by movement of the fishing net through the sheave so as to increase such actuator pressure in response to such reverse rotation.

* * * * *

UNITED STATES PATENT OFFICE
CERTIFICATE OF CORRECTION

Patent No. 3,791,625 Dated February 12, 1974

Inventor(s) Johan P. Viljoen

It is certified that error appears in the above-identified patent and that said Letters Patent are hereby corrected as shown below:

In Claim 5, line 1, "3" should read -- 4 --; Claim 6, line 1, "3" should read -- 5 --.

Signed and sealed this 3rd day of December 1974.

(SEAL)
Attest:

McCOY M. GIBSON JR.
Attesting Officer

C. MARSHALL DANN
Commissioner of Patents